United States Patent
Aynie et al.

(10) Patent No.: US 6,814,479 B2
(45) Date of Patent: Nov. 9, 2004

(54) LIGHTING OF INDICATING APPARATUS FOR A MOTOR VEHICLE

(75) Inventors: Jean-Pierre Aynie, Bobigny Cedex (FR); Norbert Brun, Bobigny Cedex (FR); Benoist Fleury, Bobigny Cedex (FR); Eric Blusseau, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/232,478

(22) Filed: Aug. 29, 2002

(65) Prior Publication Data

US 2003/0063473 A1 Apr. 3, 2003

(30) Foreign Application Priority Data

Aug. 31, 2001 (FR) ............................................ 01 11448

(51) Int. Cl.[7] ................................................. F21V 9/00
(52) U.S. Cl. ........................ 362/511; 362/554; 362/556; 362/555; 385/32
(58) Field of Search ................................ 362/511, 554, 362/556, 555; 385/32, 146, 901

(56) References Cited

U.S. PATENT DOCUMENTS

| | | | | |
|---|---|---|---|---|
| 4,436,367 A | * | 3/1984 | Lewis et al. ............... | 350/96.2 |
| 5,165,772 A | | 11/1992 | Wu ............................ | 362/80.1 |
| 5,315,159 A | | 5/1994 | Gribnau ....................... | 290/55 |
| 5,581,683 A | * | 12/1996 | Bertignoll et al. .......... | 385/146 |
| 5,745,266 A | | 4/1998 | Smith ........................... | 359/34 |
| 6,021,007 A | * | 2/2000 | Murtha ........................ | 359/834 |
| 6,356,394 B1 | * | 3/2002 | Glienicke .................... | 359/641 |
| 6,367,957 B1 | * | 4/2002 | Hering et al. ............... | 362/511 |
| 6,443,582 B1 | * | 9/2002 | Tarne et al. .................. | 362/27 |
| 6,533,429 B2 | * | 3/2003 | Yoneda ........................ | 362/31 |

FOREIGN PATENT DOCUMENTS

| | | |
|---|---|---|
| DE | 197 13 385 A 1 | 10/1998 |
| DE | 100 00 992 A 1 | 7/2001 |
| EP | 0 940 625 A2 | 9/1999 |
| FR | 2 804 493 | 3/2001 |
| WO | 90/15953 | 12/1990 |

OTHER PUBLICATIONS

French Search Report., May 13, 2002.

* cited by examiner

Primary Examiner—Thomas M. Sember
Assistant Examiner—Jacob Y. Choi
(74) Attorney, Agent, or Firm—Morgan & Finnegan, LLP

(57) ABSTRACT

An apparatus for lighting or indicating purposes in a motor vehicle includes a light guide associated with at least one light source for transporting light rays emitted by the light source from an input face to an output face via and intermediate section of the light guide. The output face of the light guide is contained between two closed lines which define a continuous internal contour and a continuous external contour, and the input face is contained between two further closed lines, also delimiting continuous internal and external contours.

12 Claims, 6 Drawing Sheets

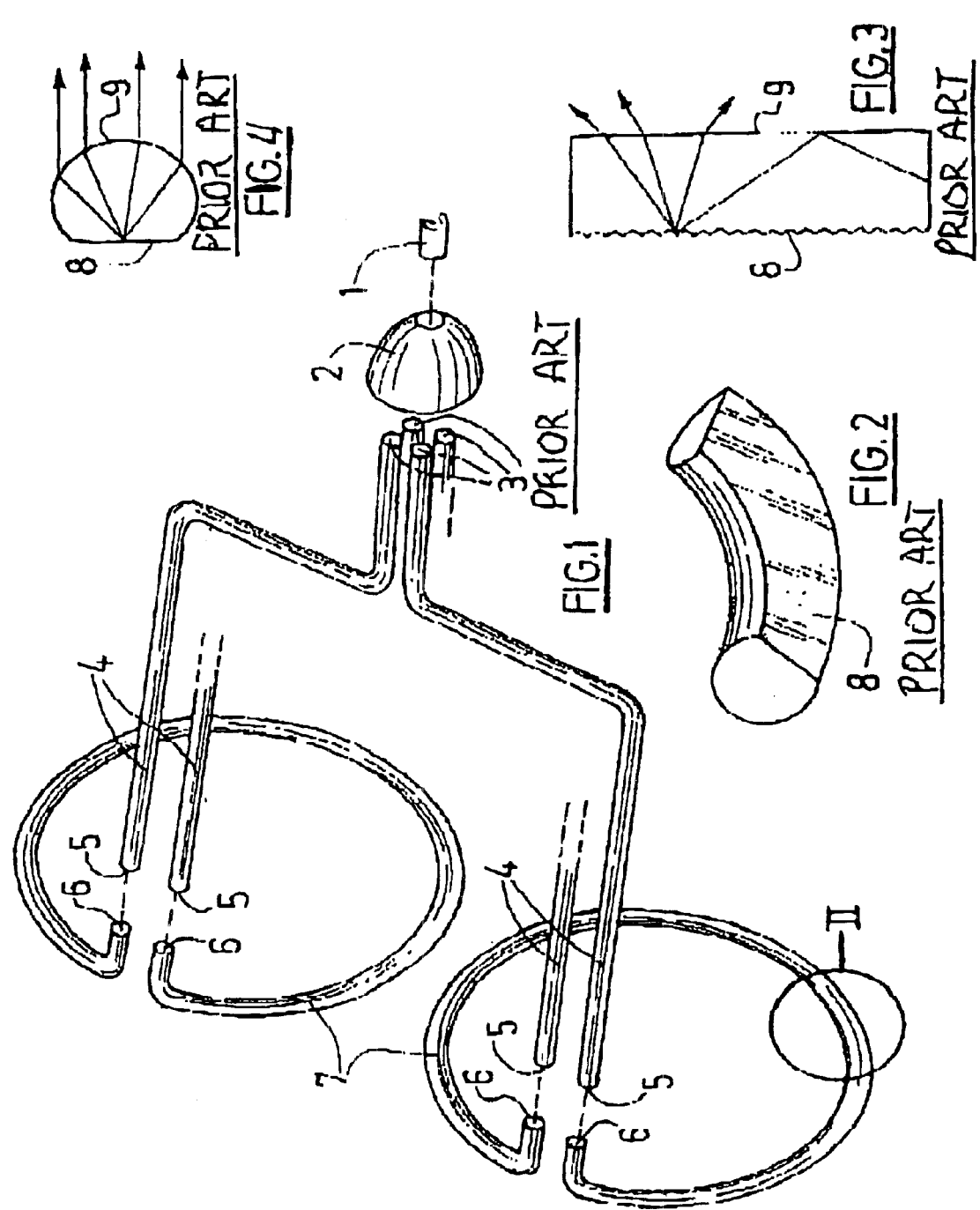

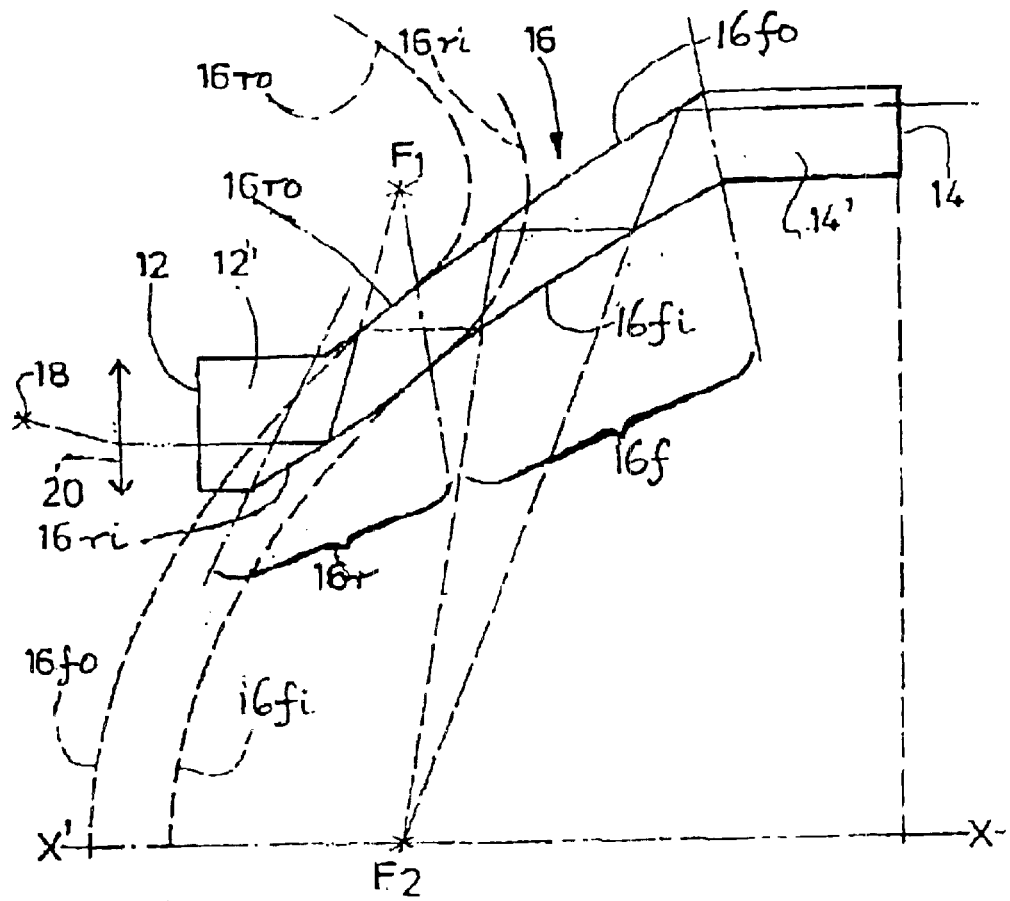
FIG.9
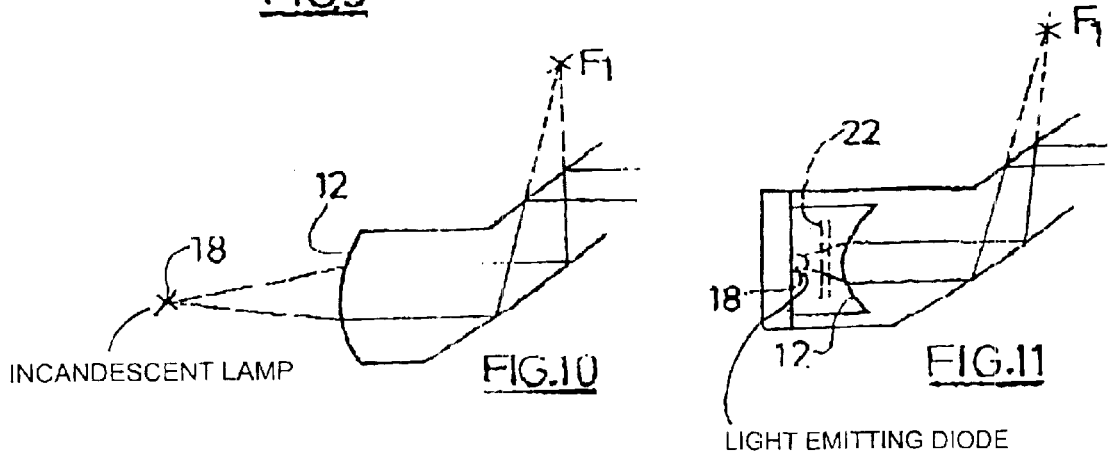
INCANDESCENT LAMP   FIG.10
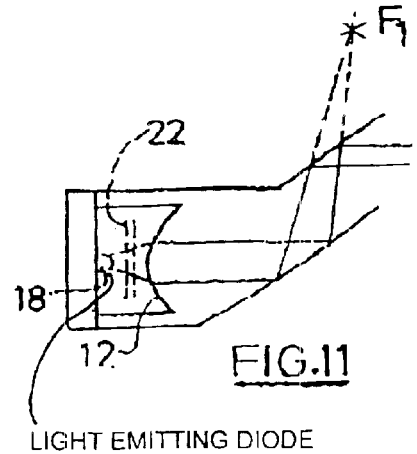
FIG.11
LIGHT EMITTING DIODE

FRESNEL PRISMS

LIGHTING OF INDICATING APPARATUS FOR A MOTOR VEHICLE

FIELD OF THE INVENTION

The present invention relates to light emitting apparatus for motor vehicles, of the kind comprising lighting or indicating apparatus for illumination and/or signalling purposes.

BACKGROUND OF THE INVENTION

Current practice in the automobile industry is to assemble together in a single housing several different lighting or indicating functions, so as to simplify the electric wiring that serves these various functions. Each function includes a light source, a reflector, and often a cover glass, these various components being arranged to provide a beam for illumination or signalling purposes, the geometric and photometric characteristics of which must be in conformity with various legal requirements.

Each of these functions thus necessitates provision of a minimum volume for fitting it within a particular lighting or indicating apparatus. However, the space available for fitting such apparatus tends to be more and more reduced as automobile design evolves, and this is true both at the front and at the rear of a modern motor vehicle. In this connection, aerodynamic requirements and the ideas imposed by stylists lead to forms which are often very different from those which would result only from technical considerations. As a result, in many cases, the space available for grouping together these functions in a common housing is insufficient, and it is therefore necessary to distribute various functions in various different casings, which leads to an increase in costs and also in manufacturing time for fitting wiring and assembling the vehicle generally.

Various attempts have already been made to overcome these problems by making use of light guides. This prior art will now be explained, with reference to FIGS. 1 to 4 of the accompanying drawings, to which reference is now made. FIGS. 1 to 4 show one example of a known apparatus of the kind mentioned above. FIG. 1 shows a lamp 1 which is fitted within a reflector 2 for concentrating light rays emitted by the lamp 1 on the input face 3 of a set of optical fibres or a set of groups of optical fibres 4. The reflector 2 is for example of the elliptical type, the light source of the lamp 1 being placed close to a first focus of the reflector 2. The faces 3 are disposed close to the second focus of the reflector 2. The output faces 5 of the optical fibres 4 are coupled to the input faces 6 of light guides 7.

The light guides 7 in this example are so configured that they form a circular shape, and they are for example so arranged that they surround the front perimeter of a dipped or passing beam headlight. The light guides 7 are for example of the kind which are described in German published patent specification No. DE 41 29094A. As can be seen in FIG. 2 of the present Application, the light guides have a substantially flat face 8 for reflection of the light, and a cylindrical or toroidal face 9 for distributing the light. The face 8 consists of a succession of prisms which pass on the light rays that are propagated within the guide towards the face 9 (FIG. 3), from which they are emitted in the form of an output beam consisting of substantially parallel light rays, as can be seen in FIG. 4. The output beam may for example serve for a sidelight function within a headlight.

Such a solution is particularly cumbersome, especially since it makes it necessary to provide a light source such as a halogen lamp, an elliptical reflector, a flexible bundle of optical fibres, and a rigid light guide made of glass or plastics material. In addition, there is always an empty space between the two ends of the light guide through which the light is injected into the guide, and this empty space is detrimental to the appearance of the resulting assembly. In addition, this arrangement does not enable shapes to be provided that have sharp angles, because the propagation of the light within the light guide would be interrupted by the angles.

Another solution could consist in replacing the light guide 7 by a fluorescent tube. This arrangement is less cumbersome and does enable sharper angles to be used, but it does however still leave an empty space between its two ends.

DISCUSSION OF THE INVENTION

Within the context of the foregoing, an object of the present invention is to propose a lighting or indicating apparatus which enables a lighting and indicating function to be easily incorporated in a headlight, the said lighting or indicating apparatus being also easy to assemble, reliable in operation, and having photometric performance that conforms with legal requirements. A further object is to provide such an apparatus which is less cumbersome and which is easily adaptable to the demands of stylists, so that it can have any appearance whatever from the aesthetic point of view.

The invention is accordingly directed to lighting or indicating apparatus for a motor vehicle, comprising at least one light guide associated with at least one light source for transporting light rays emitted from the light source and entering the light guide through an input face thereof, passing to an output face of the light guide via an intermediate section for transporting the light rays.

According to the invention, the input face of the light guide is defined between two closed lines delimiting a continuous internal contour and a continuous external contour, and the output face is defined between two closed lines delimiting a continuous internal contour and a continuous external contour.

According to a preferred feature of the invention, the intermediate section consists of a block of transparent material defining a continuous volume between the input face and output face.

Preferably, the light guide is associated with a plurality of light sources.

In some embodiments, the light sources are in the form of at least one incandescent lamp. In that case, at least one optical device is associated with the incandescent lamp for converting the light rays emitted from the incandescent lamp into a beam of parallel rays, and the input face of the light guide, facing the lamp, is flat.

In another version, the incandescent lamp is disposed directly behind the input face, and the input face is convex.

In other embodiments, the light sources consist of at least one light emitting diode (LED). In this case, it can be arranged that:

the light emitting diode is disposed directly behind the input face, the input face being convex; and/or at least one optical device is associated with the light emitting diode for spreading the light flux emitted by the light emitting diode homogeneously in all directions parallel to an optical axis parallel to the optical axis of the light guide, and the input face facing the light emitting diode is generally flat and includes Fresnel prisms.

These various embodiments are applicable where the lighting or indicating apparatus has several light guides nested one within another. It may also be provided that the input faces of the light guides are situated in the vicinity of a common entry plane, and/or that the output faces of the light guides are situated in the vicinity of a common exit plane.

Further features and advantages of the present invention will appear more clearly on a reading of the following detailed description of some preferred embodiments of the invention, which is given by way of non-limiting example only and with reference to the accompanying drawings.

BRIEF DESCRIPTION OF THE DRAWINGS

FIGS. 1 to 4 have already been described in detail above.

FIG. 1 is a diagrammatic perspective view of an apparatus already known in the prior art.

FIG. 2 shows on a larger scale the detail indicated at II in FIG. 1. FIG. 3 is a view in longitudinal cross section of the light guide seen in FIGS. 1 and 2.

FIG. 4 is a view in transverse cross section of the light guide in FIGS. 1 and 2.

FIG. 9 is a view in axial cross section showing the light guide of the invention in a first modified version.

FIG. 10 shows, in axial cross section, the light guide of the invention in a second modified embodiment.

FIG. 11 is a view in axial cross section of the light guide of the invention in a third modified embodiment.

DESCRIPTION OF PREFERRED EMBODIMENTS OF THE INVENTION

In this description, the convention will be adopted that the direction in which the light beam produced by the apparatus is emitted will be called forward, and the opposite direction will be called backward. Words such as front, rear, and so on are to be construed accordingly.

Figures 5, 6:
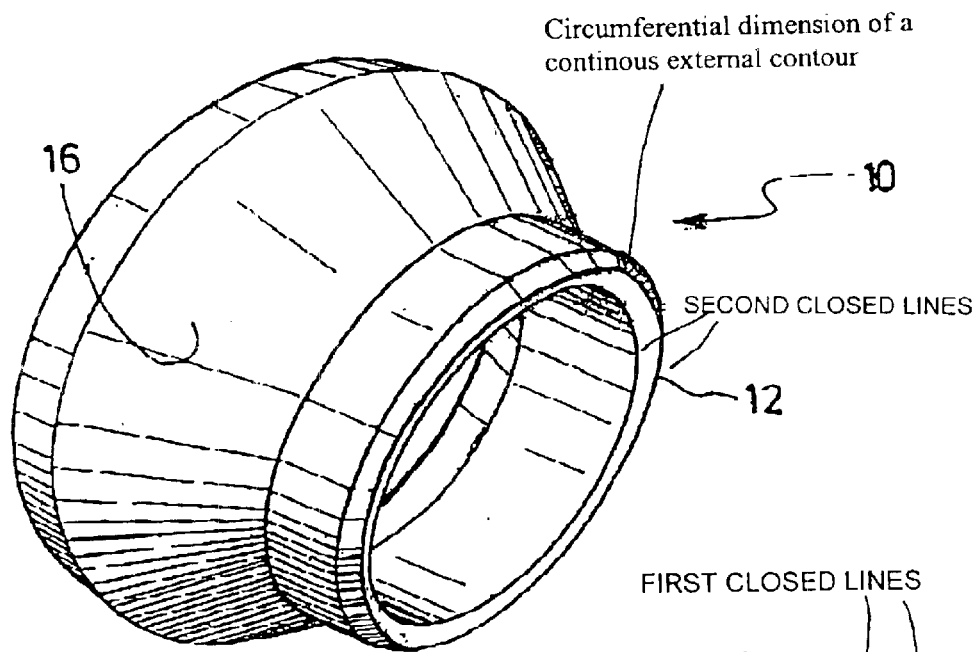
FIG. 5 is a three-quarter perspective view from behind of a light guide made in accordance with the present invention.
FIG. 6 is a three-quarter perspective view from the front, of the light guide made in accordance with the present invention.
Figure 7:
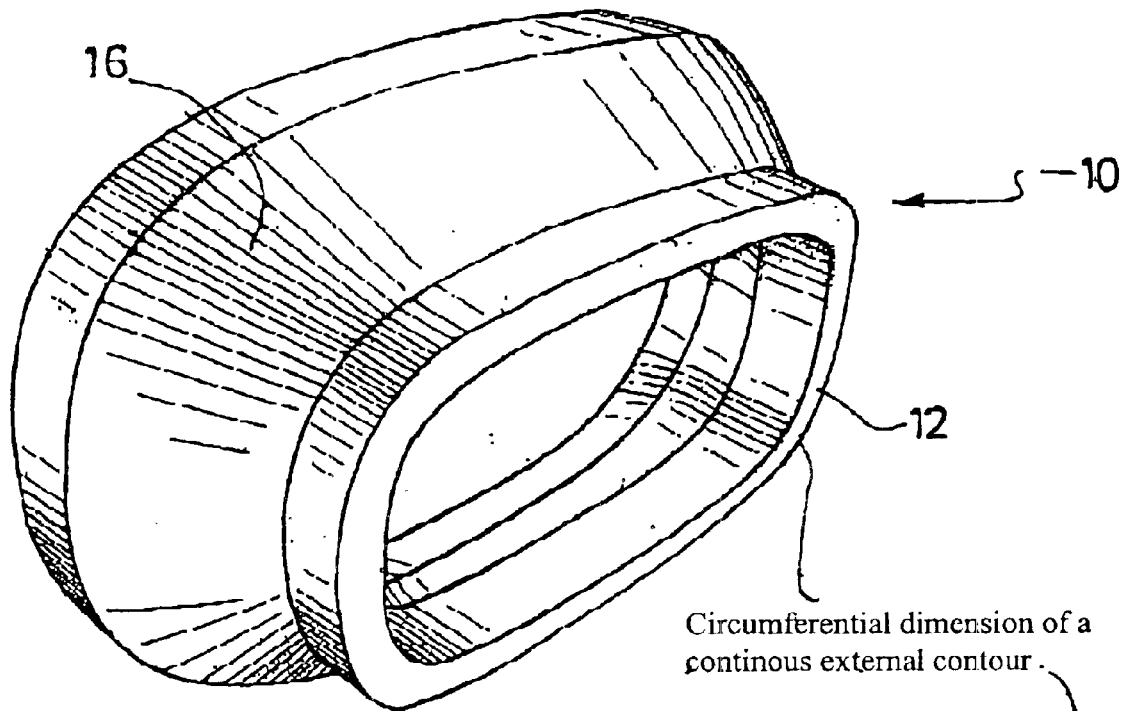
FIG. 7 is a view similar to that in FIG. 5, again showing in three-quarter rear perspective view a light guide according to the invention, but here in a further embodiment.
Figure 8:
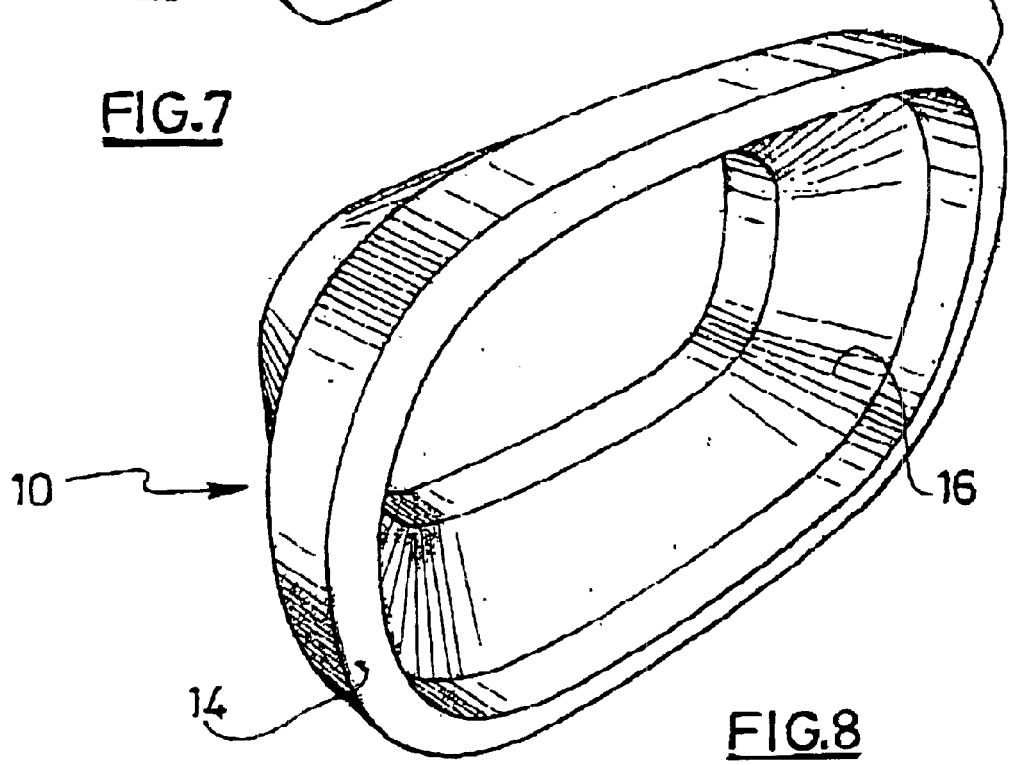
FIG. 8 is a view similar to FIG. 6, being again a three-quarter front perspective view, and shows another embodiment of the light guide according to the invention.

Since FIGS. 1 to 4 have already been described in the discussion of the prior art above, reference will now be made to FIGS. 5 and 6, and also to FIGS. 7 and 8. A light guide according to the invention is adapted to be used in a lighting or indicating apparatus for a motor vehicle. The light guide itself, denoted by the reference numeral 10, has an input face 12, an output face 14, and an intermediate section 16. The input face 12 preferably has the same form as the output face 14, so that in FIGS. 5 and 6 both these faces are annular. Reference to FIGS. 7 and 8 shows the same faces as rectangular. The dimensions of the input face are smaller than those of the output face. In FIGS. 5 and 6, the light guide 10 is accordingly frusto-conical, while in FIGS. 7 and 8, it has the form of a frustum of a pyramid, for example with a rectangular base with corners which are rounded to a greater or lesser extent.

The input face 12 is adapted to receive light rays emitted from the light source 18 (see FIG. 9). Referring to FIG. 9, the input face 12 may be flat and receive the light rays from the source 18 after they have been converted by an object lens 20 into a parallel beam. In the modified versions shown in FIGS. 10 and 11, the input face 12 is convex so as to receive directly the light rays emitted by the light source 18 and to convert them itself into an essentially parallel beam. In FIG. 10, the source 18 is the filament of an incandescent lamp which must therefore be located at a predetermined distance from the input face 12 if the light guide 10 is made of a plastics material, so as to avoid undue heating of the latter. In FIG. 11, the light source 18 consists of a light emitting diode (LED), which enables it to be located in the immediate proximity of the input face 12. The axial dimension of this last modified version is much smaller than that of the versions in FIGS. 9 and 10, and this is likely to make it preferable in some applications.

In the three versions shown in FIGS. 9 to 11, the light rays are propagated in the light guide 10 after having passed through the input face 12, all of the light rays forming a beam consisting of essentially parallel rays. Only one of these rays is shown in FIG. 9 in the interests of clarity. Such a light beam is then incident on the internal face of the intermediate section 16.

The input face 12 may be followed immediately by the intermediate section 16, or may be joined to the latter through a cylindrical extension portion 12', FIG. 9, which in no way changes the progress of the parallel light rays. The same is true for the output face 14 which may immediately follow the intermediate section, or it may be preceded by a cylindrical extension portion 14'; this again does not in any way change the behaviour of the parallel light rays, as will be seen later herein. More precisely, the intermediate section 16 consists of two sub-sections, namely a rear section 16r and a front section 16f, which are delimited by phantom lines in FIG. 9. Each sub-section 16r and 16f has an inner surface 16ri and 16fi respectively, and an outer surface 16ro and 16fo respectively.

In the case of a frusto-conical light guide such as that shown in FIGS. 5 and 6, the surfaces 16ri and 16ro of the rear section 16r are portions of paraboloids of revolution, the foci $F_1$ of which are situated on a circle centred on the optical axis X'-X of the light guide. These paraboloids join the inner and outer profiles of the input face 12. In FIG. 9, broken lines represent notional extensions of these paraboloids of revolution. Similarly, the surfaces 16fi and 16fo of the front section 16f are portions of paraboloids of revolution having a focus $F_2$ situated on the optical axis X'-X, and these portions of paraboloids join the inner and outer profiles of the output face 14. Notional extensions of these paraboloids of revolution are again indicated in broken lines.

As mentioned above, the light rays are propagated within the light guide 10 after having passed through the input face 12. All these rays form a beam consisting of essentially parallel rays which are incident on the inner face of the intermediate section 16, and more precisely on the parabolic surface 16*ri*. Accordingly, these rays are reflected by total reflection on the surface 16*ri* so that they are convergent, in each plane passing through the optical axis, towards the foci $F_1$. Before reaching these foci they are received by the parabolic surface 16*ro*, having the same focus $F_1$. The light rays are then reflected by the surface 16*ro*, by total reflection, so as to give rise to a new beam of parallel rays.

The light rays then pass into the front section 16*f* in which the same total reflection effects are produced on the inner surface 16*fi* which reflects these rays in a divergent beam, the virtual source of which is the focus $F_2$, and on the outer surface 16*fo* which reflects these rays in a parallel beam.

The light rays thus reach the output face 14, whether or not it is preceded by the extension portion 16', in the form of a beam consisting of parallel rays. They are therefore able to emerge from the light guide 10 in an emergent light beam. It may be an advantage to arrange that the output face 14 is unpolished, thereby ensuring controlled diffusion of the emergent light beam.

So that the beam emerging from the output face 14 will be as homogeneous as possible, it will be possible to provide several light sources, spaced apart at regular intervals facing the input face 12. According to the emission diagram of the light sources used, the number of the latter may vary. For example, for light sources giving Lambertian emission, three or four sources will be enough for a frusto-conical light guide. On the other hand, for light sources with specular emission, that is to say with a narrow beam, such as light emitting diodes, a larger number of light sources will be required.

Figure 12:
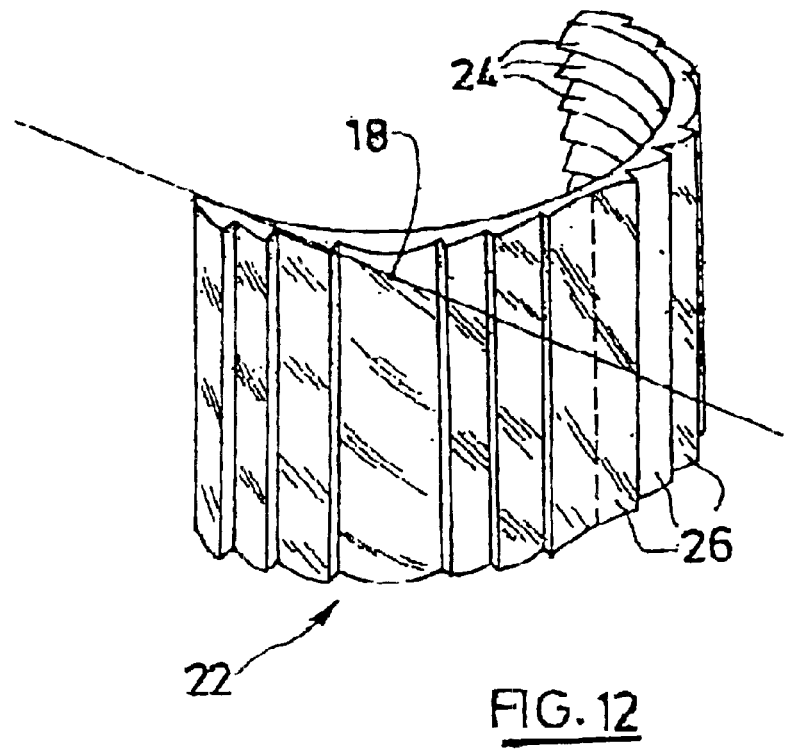
FIG. 12 shows a bonnet lens which is adapted for use with the third modified embodiment shown in FIG. 11.
Figure 13:
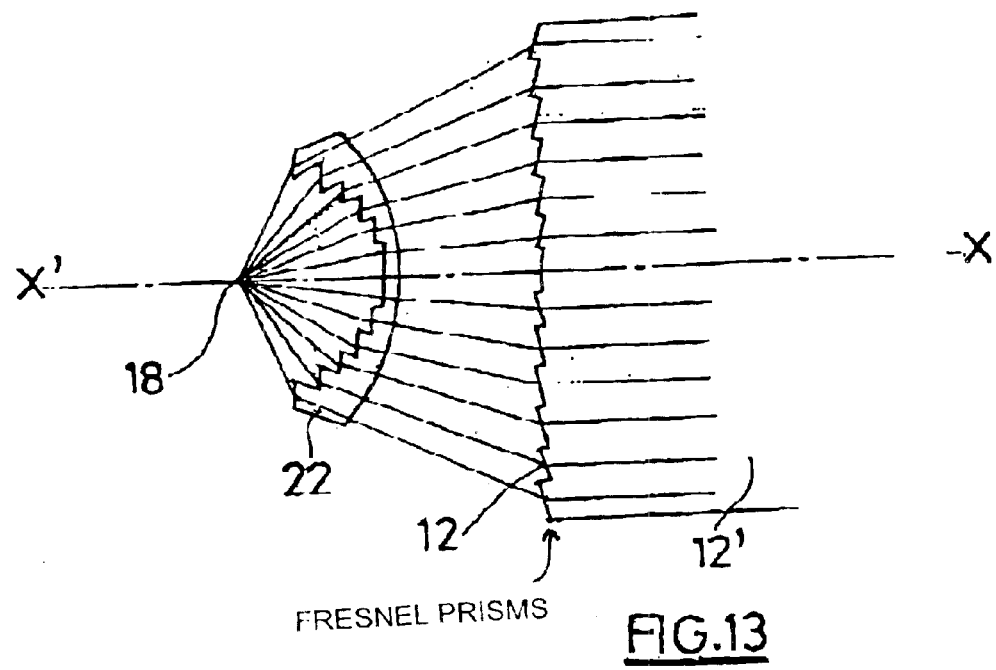
FIG. 13 is a side view of the third embodiment shown in FIG. 11, when provided with the bonnet lens seen in FIG. 12.

Preferably, in order to reduce the number of light emitting diodes, it is possible to dispose, between the latter and the input face 12 of the light guide, a flux spreading means such as that shown in FIGS. 12 and 13, to which reference is now also made. This spreading device is also indicated in broken lines at 22 in FIG. 11. This device consists of a substantially cylindrical bonnet lens 22 which is such as to spread or redistribute the light rays emitted from the LED 18.

The bonnet lens 22 is provided on its rear face with ribs 24 for spreading the light flux in a first direction, and ribs 26 on its front face for spreading the flux in a second direction at right angles to the first direction. The input face 12 is convex, or, as is shown in FIG. 13, generally flat, and comprises Fresnel prisms such that the light rays, after passing through the input face, are all parallel to each other. The result of such an arrangement is that after passing through the input face 12, the flux is homogeneous in all directions at right angles to the axis x'x of emission of the LED, which is parallel to the axis X'-X of the light guide 10. A light flux spreading device of this kind is known per se, for example from U.S. Pat. Nos. 4,859,043 and 6,170,971, which are hereby incorporated by reference in their entirety.

In this way a lighting or indicating apparatus is obtained which easily enables an additional lighting and/or indicating function to be provided within a headlight. This additional function may take any desired form, being for example round, rectangular, triangular, oval etc., and being confined between two closed lines delimiting a continuous internal contour and a continuous external contour without interruption. In this connection, it is easy to choose the form and dimensions of the light guide 10, that is to say to define the parameters of the pair of paraboloids 16*fi* and 16*fo* of the front section 16*f* with their common focus $F_2$, in such a way that the light guide 10 is easily incorporated in the free space behind the function to be surrounded, without disturbing operation of the latter.

The light sources placed behind the input face 12 may be controlled independently of the light source for the lighting function located within the light guide 10. Thus for example, a "sidelight" function may be obtained around a "dipped beam" function without it being necessary to provide in the dipped beam function an emplacement for the sidelight, which always carries a penalty for the function thereby disturbed as well as being detrimental to the general appearance of the headlight. In this way, the sidelight function can be added into a lighting or indicating apparatus without any increase in size or any modification of the reflector.

In some applications it will even be possible to arrange that at least the inner surface 16*fi* of the intermediate section 16 of the light-guide is metallised, so that this inner surface serves at the same time as a reflector for a light source situated at the focus $F_2$ of the paraboloid that defines the inner surface 16*fi*. In this way a reflective mirror structure is obtained, for example for long range lighting, with a light source located at the focus $F_2$, fulfilling another function, for example that of a sidelight, within the actual material of the reflector.

A practical example has shown that the difference between the focal distances of the surfaces 16*fi* and 16*fo* is of the order of 3 to 4 millimeters. The dimensions of the pair of paraboloids 16*ri* and 16*ro* of the rear section 16*r*, having the common focus F1, are derived from those of the pair of paraboloids 16*fi* and 16*fo*, and are three to four times smaller than the latter. As a result, the light guide 10 may easily be formed by injection moulding, the thicknesses of material being less than 4 mm. Materials that lend themselves particularly well to such mouldings are polymethylmethacrylate (PMMA) or polycarbonate (PC). The light guide 10 thus consists, from the input face 12 to the output face 14, of a block Of transparent material defining a continuous volume.

Figure 15:
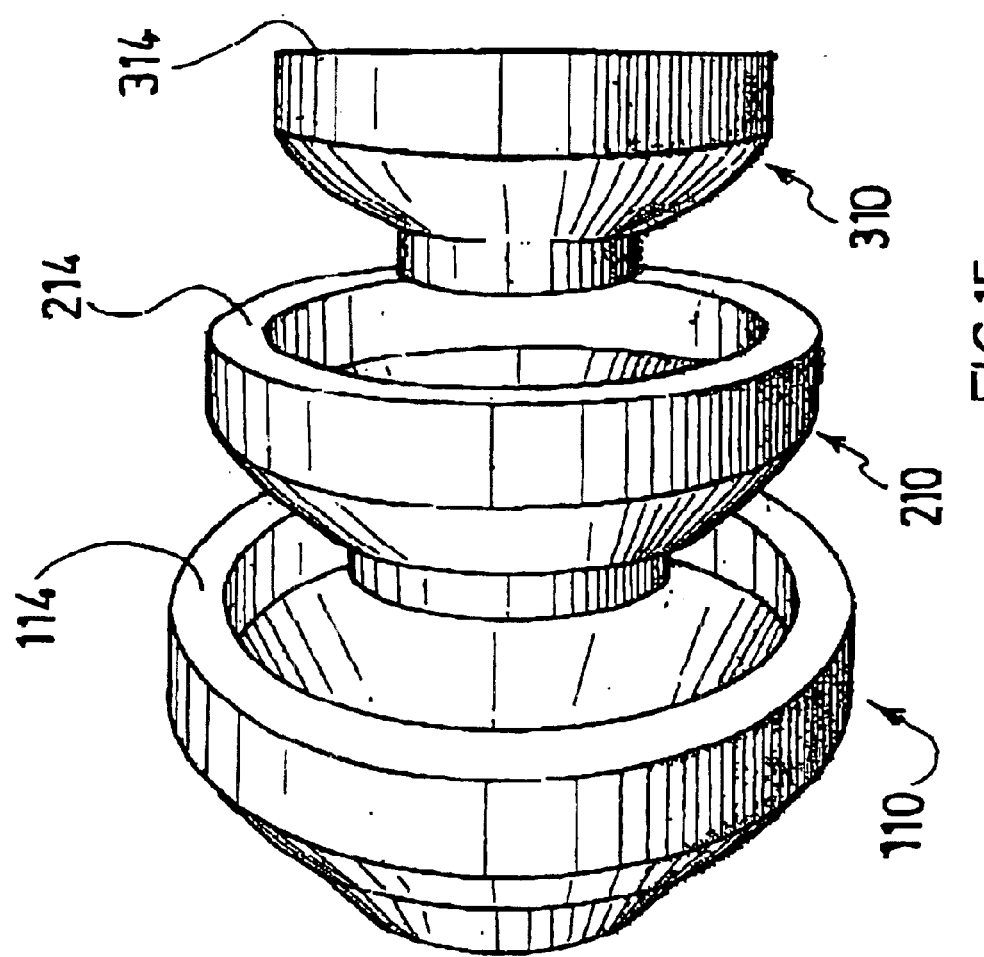
FIG. 15 is an exploded perspective view of the same three guides as in FIG. 14.
Figure 14:
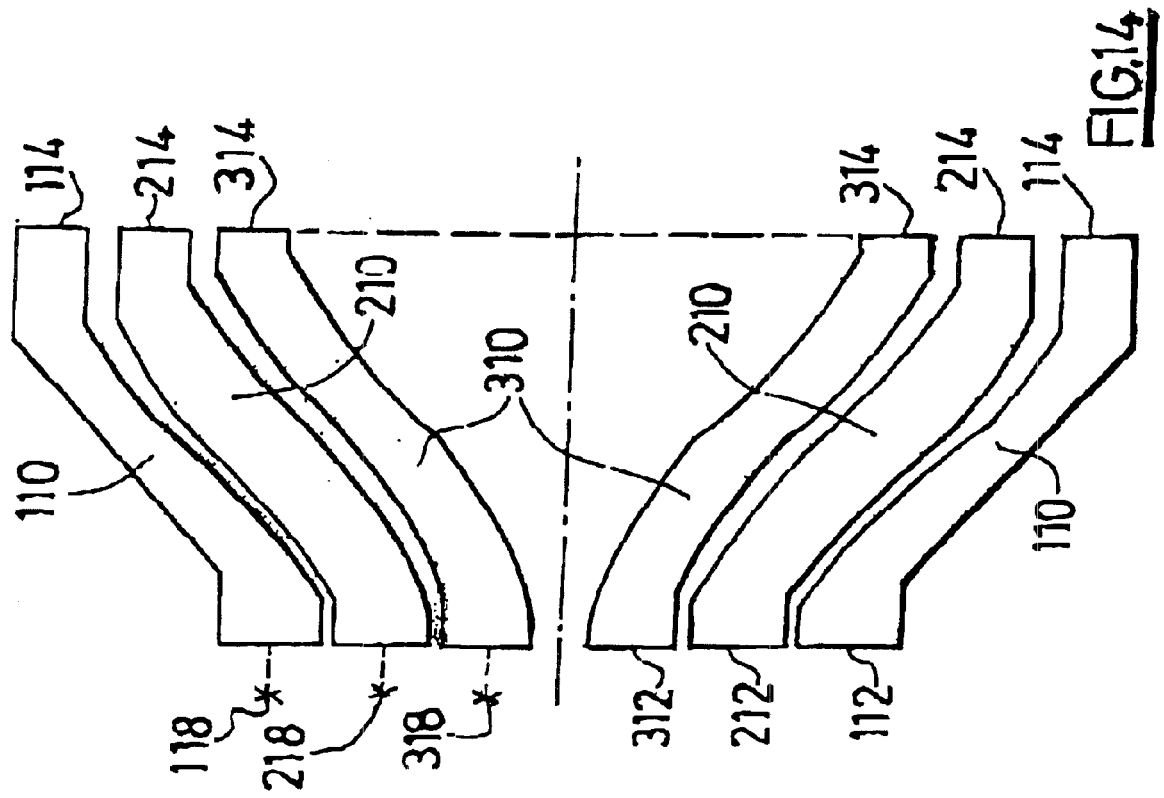
FIG. 14 is a perspective view showing three light guides in accordance with the present invention, nested within each other.

Accordingly, and as shown in FIG. 14 to which reference is now made, it is possible to arrange several light guides 110, 210, 310 in accordance with the invention in such a way that they nest within each other. FIG. 15 is a perspective view showing the three guides shown in FIG. 14 before they are nested together. Preferably, their input faces, 112, 212, 312, all lie in a common entry plane, or else they are in the vicinity of a common entry plane. Similarly, their output faces 114, 214 and 314 are situated in a common exit plane or else they are in the vicinity of a common exit plane. Each light guide is associated with light sources or sets of light sources 118, 218, 318, the power supplies for which are controlled separately from each other.

In this way it is possible to combine several lighting or indicating functions in a set of light guides nested or telescoped within each other, concentrically in the case of FIGS. 14 and 15, by using several light guides of the kind shown in FIGS. 5 and 6, or by drawing other patterns if, for example, light guides of the kind shown in FIGS. 7 and 8 are used. Each function may have the regulation colour for which it is provided, namely white, amber or red. The advantage offered by such an arrangement with functions nested together is that, when the light sources are extinguished, the output faces all have the same colour independently of the colour of the function performed when the light source is illuminated.

It is also possible to arrange that all of the light sources for the different light guides nested together have the same lighting or indicating function, but in different amounts. For example, it could be arranged that the light sources are arranged with a stop light function, and that the sources associated with the light guide having the smallest output face are illuminated first, those associated with the other light guides being lit progressively according to the severity of the braking being applied. In this way, an indicating function will be obtained in which the illuminated surface will grow as the braking effect increases, thereby giving an additional indicator to the driver of the next following vehicle.

The present invention is of course not limited to the embodiments described above, but the person skilled in this art will be able to apply to it numerous modifications within the scope of the invention. Thus for example, incandescent lamps and light emitting diodes may be used at the same time as light sources, the incandescent lamps being either associated or otherwise with optical devices for collimating the light rays on the input face of the light guide. Such a mixture of light sources may be arranged according to what particular aesthetic effects are sought.

What is claimed is:

1. A light emitting apparatus for a motor vehicle, comprising at least one light source for emitting light rays, and at least one light guide associated with the light source and disposed in the path of said light rays for transporting the light rays, the light guide having an input face, an output face and an intermediate section joining the input and output faces, whereby light from the light source enters the light guide through the input face and passes through the intermediate section for onward emission through the output face, wherein the light guide defines two first closed lines delimiting a continuous internal contour and a continuous external contour, said output face being defined between said first closed lines, the light guide further defining two second closed lines delimiting a continuous internal contour and a continuous external contour, said input face being defined between the second closed lines, wherein the input face and the output face are lying approximately in parallel planes, and wherein a circumferential dimension of the continuous external contour corresponding to said output face is greater than a circumferential dimension of the continuous external contour corresponding to said input face.

2. The apparatus according to claim 1, wherein the intermediate section consists of a block of transparent material defining a continuous volume between the input and output faces.

3. The apparatus according to claim 1, having a plurality of said light sources with which the light guide is associated.

4. The apparatus according to claim 3, wherein said at least one light source comprises at least one incandescent lamp.

5. The apparatus according to claim 4, further including an optical device associated with said at least one incandescent lamp and disposed in the path of the light emitted by said at least one incandescent lamp, for converting light rays from the light source into a parallel beam, the input face of the light guide being flat.

6. The apparatus according to claim 4, wherein said at least one lamp is disposed directly behind the input face, the input face being convex.

7. The apparatus according to claim 3, wherein said at least one light source comprises at least one light emitting diode.

8. The apparatus according to claim 7, wherein said at least one diode is disposed directly behind the input face of the light guide, said input face being convex.

9. A light emitting apparatus for a motor vehicle, comprising at least one light source for emitting light rays, and at least one light guide associated with the light source and disposed in the path of said light rays for transporting the light rays, the light guide having an input face, an output face and an intermediate section joining the input and output faces, whereby light from the light source enters the light guide through the input face and passes through the intermediate section for onward emission through the output face, wherein the light guide defines two first closed lines delimiting a continuous internal contour and a continuous external contour, said output face being defined between the said first closed lines, the light guide further defining two second closed lines delimiting a continuous internal contour and a continuous external contour, said input face being defined between the second closed lines;

said light guide having a plurality of said light sources with which the light guide is associated, wherein said at least one light source comprises at least one light emitting diode, and wherein said light emitting apparatus includes at least one optical device associated with said at least one light emitting diode for spreading the light emitted by said at least one light emitting diode, the light guide defining a first optical axis of the light guide, said optical device defining a second optical axis parallel to said first optical axis, whereby said optical device spreads the light from said at least one light emitting diode homogeneously in all directions at right angles to said second optical axis, the input of the light guide being generally flat and including Fresnel prisms.

10. The apparatus according to claim 1, having a plurality of light guides nested one within another.

11. The apparatus according to claim 10, defining a common entry plane for the light guides, the input faces of said light guides being situated close to the common entry plane.

12. The apparatus according to claim 10, defining a common exit plane for the light guides, the output faces of said light guides being situated close to the common exit plane.

* * * * *